(12) United States Patent
Berjot et al.

(10) Patent No.: US 11,519,300 B2
(45) Date of Patent: Dec. 6, 2022

(54) ASSEMBLY OF AN ENGINE WITH AN AIRCRAFT PYLON

(71) Applicant: Airbus Operations (S.A.S.), Toulouse (FR)

(72) Inventors: Michael Berjot, Toulouse (FR); Rémi Lansiaux, Toulouse (FR); William Bras, Toulouse (FR); Germain Gueneau, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/479,540

(22) Filed: Sep. 20, 2021

(65) Prior Publication Data

US 2022/0090518 A1 Mar. 24, 2022

(30) Foreign Application Priority Data

Sep. 21, 2020 (FR) ...................................... 2009554

(51) Int. Cl.
*F01D 25/28* (2006.01)

(52) U.S. Cl.
CPC ........ *F01D 25/28* (2013.01); *F05D 2220/323* (2013.01); *F05D 2240/90* (2013.01); *F05D 2300/30* (2013.01)

(58) Field of Classification Search
CPC ......... F01D 25/28; B64D 27/00; B64D 27/26; F05D 2220/323; F05D 2240/90; F05D 2300/30
See application file for complete search history.

(56) References Cited

U.S. PATENT DOCUMENTS

| 8,727,268 B2 * | 5/2014 | Combes | B64D 27/26 244/54 |
| 8,763,952 B2 * | 7/2014 | Haramburu | B64D 27/26 60/797 |

(Continued)

FOREIGN PATENT DOCUMENTS

| EP | 3 705 404 A1 | 9/2020 |
| FR | 2 861 364 A1 | 4/2005 |

(Continued)

OTHER PUBLICATIONS

French Search Report for Application No. 2009554 dated May 26, 2021.

*Primary Examiner* — Courtney D Heinle
*Assistant Examiner* — Ryan C Clark
(74) *Attorney, Agent, or Firm* — Jenkins, Wilson, Taylor & Hunt, PA

(57) ABSTRACT

An assembly of an engine with a pylon, including a force reacting assembly having a connection device and two rods, the connection device including a shoe. A spreader extends between first and second ends and has a central part connected to the shoe by a main connection including a main rotation pin and axis in a plane of symmetry of the connection device. Two fittings are on either side of the plane of symmetry each having two arms between which the spreader is positioned. A first, respectively second, rod includes a front end fastened to the engine and a rear end fastened to the first, respectively second, end of the spreader and to the first, respectively second, fitting by a secondary connection. Two extensions of the spreader are each associated with a pair of elastic stops. For the first, respectively second, end of the spreader, each stop is between an arm of the first, respectively second, fitting and the extension.

3 Claims, 5 Drawing Sheets

(56) References Cited

U.S. PATENT DOCUMENTS

| | | | |
|---|---|---|---|
| 2005/0067528 A1* | 3/2005 | Loewenstein | B64D 27/26 244/54 |
| 2016/0090868 A1* | 3/2016 | Brain | F16B 39/10 470/4 |
| 2019/0202573 A1* | 7/2019 | Pautis | B64D 27/26 |
| 2020/0346771 A1* | 11/2020 | Deforet | B64D 27/26 |

FOREIGN PATENT DOCUMENTS

| | | |
|---|---|---|
| FR | 2 914 908 A1 | 10/2008 |
| FR | 3 058 986 A1 | 5/2018 |
| FR | 3 093 704 A1 | 9/2020 |

\* cited by examiner

SECTION A-A

ASSEMBLY OF AN ENGINE WITH AN AIRCRAFT PYLON

CROSS-REFERENCE TO RELATED APPLICATION

This application claims priority to French patent application number 20 09554 filed on Sep. 21, 2020, the entire disclosure of which is incorporated by reference herein.

TECHNICAL HELD

The disclosure herein relates to an assembly of an engine with an aircraft pylon

BACKGROUND

Conventionally, and with reference to FIGS. 1 and 2, a propulsion assembly 1 fastened beneath the wing 2 of an aircraft comprises a turbomachine 3 with a nacelle 4 surrounding an engine 5, and a pylon 6 for fastening the turbomachine to the wing 2 of the aircraft. The pylon 6 is made up of a primary structure 6a in the form of a box. The engine 5 is fastened to the primary structure 6a via a system of engine attachments that is made up of a front engine attachment 7 at the front, a rear engine attachment 8 at the rear, and, between the front and rear engine attachments 7, 8, a force reacting assembly 9 that reacts the thrust forces from the engine 5 and comprises two thrust rods 10, 11 connecting the engine 5 and a connection device 20 secured to the pylon 6.

The connection device 20 comprises:

a shoe 21, pressed against and fastened to the lower face (the face facing the ground) of the primary structure 6a and having a main clevis 22; and a spreader 23 connected to the main clevis 22 by a main connection 24 having a main rotation axis R1 positioned in a plane of symmetry V of the connection device 20 passing through the longitudinal axis X of the engine 5.

The two thrust rods 10, 11 are situated on either side of the plane of symmetry V, and each rod 10, 11 comprises a rear end 10a, 11a connected to the spreader 23 and a front end connected to the engine 5.

The rear end of each of the thrust rods 10, 11 is connected to one of the ends of the spreader 23 by a secondary connection 25 having a secondary rotation axis R2 positioned in a plane parallel to the plane of symmetry V of the connection device 20.

The thrust rods 10, 11, the secondary connections 25, the spreader 23, the main connection 24 and the shoe 21 define two primary thrust paths between the engine 5 and the primary structure 6a.

The connection device 20 also comprises two fittings 26 with two arms that are as one with the shoe 21 and are disposed on either side of the main clevis 22 with respect to the plane of symmetry V. Each fitting 26 is dedicated to a thrust rod 10, 11, The arms of the fitting 26 sandwich the rear end 10a, 11a of the thrust rod 10, 11. The fittings 26 are connected to the rear ends 10a, 11a of the thrust rods 10, 11 by the secondary connections 25. The thrust rods 10, 11, the secondary connections 25 and the fittings 26 define two secondary thrust paths, between the engine 5 and the primary structure 6a, which compensate for a possible failure of one of the primary thrust paths.

The spreader 23 can pivot about a displacement rotation axis Rd contained in the plane of symmetry V and perpendicular to the main rotation axis R1. The amplitude of displacement of the spreader 23 about the displacement rotation axis Rd is limited by the space between the arms of the fittings 26. The vibrations caused by the operation of the engine 5 generate an oscillatory movement of the spreader 23 about the displacement axis Rd. This oscillatory movement, which is amplified by certain vibrational frequencies of the engine 5, creates mechanical fatigue of the spreader 23 and of the connections between the spreader 23 and the shoe 21 and between the thrust rods 10, 11 and the spreader 23. Frequent inspections have to be undertaken by operators so as to verify the good mechanical state of the components mentioned, and to replace them in the event of signs of excessive mechanical fatigue. These replacements are expensive for aircraft operators.

SUMMARY

The disclosure herein aims to remedy all or some of the drawbacks of the prior art. To this end, the subject of the disclosure herein is an assembly of an engine with an aircraft pylon, the assembly comprising a front engine attachment, a rear engine attachment, and a force reacting assembly, the force reacting assembly comprising a connection device fastened to the pylon and two rods, the connection device comprising:

a shoe configured to be fastened to the pylon;

a spreader, extending along a longitudinal axis between first and second ends, and having a central part connected to the shoe by a main connection comprising a main rotation pin and axis contained in a plane of symmetry of the connection device;

two fittings as one with the shoe and disposed on either side of the plane of symmetry, wherein each fitting has two arms arranged at a distance from one another and between which the spreader is positioned;

a first, respectively second, rod comprising a front end fastened to the engine and a rear end fastened to the first, respectively second, end of the spreader and to the first, respectively second, fitting by a secondary connection, the spreader comprising two extensions, with one extension arranged at each end of the spreader and extending the spreader in a direction parallel to the longitudinal axis of the spreader, each extension being associated with a pair of elastic stops sandwiching the extension, and wherein, for the first, respectively second, end of the spreader, each stop, which is positioned between an arm of the first, respectively second, fitting and the extension, has a section in the shape of a U open towards the inside of the connection device with a first leg fastened to the arm of the fitting, a second leg, parallel to the first leg, intended to be in contact with the extension, and a base joining the two legs and arranged outside the space between the arms of the fitting.

BRIEF DESCRIPTION OF THE DRAWINGS

The abovementioned features of the disclosure herein, along with others, will become more clearly apparent upon reading the following description of an exemplary embodiment, the description being given with reference to the appended drawings, in which.

DETAILED DESCRIPTION

Figure 1:
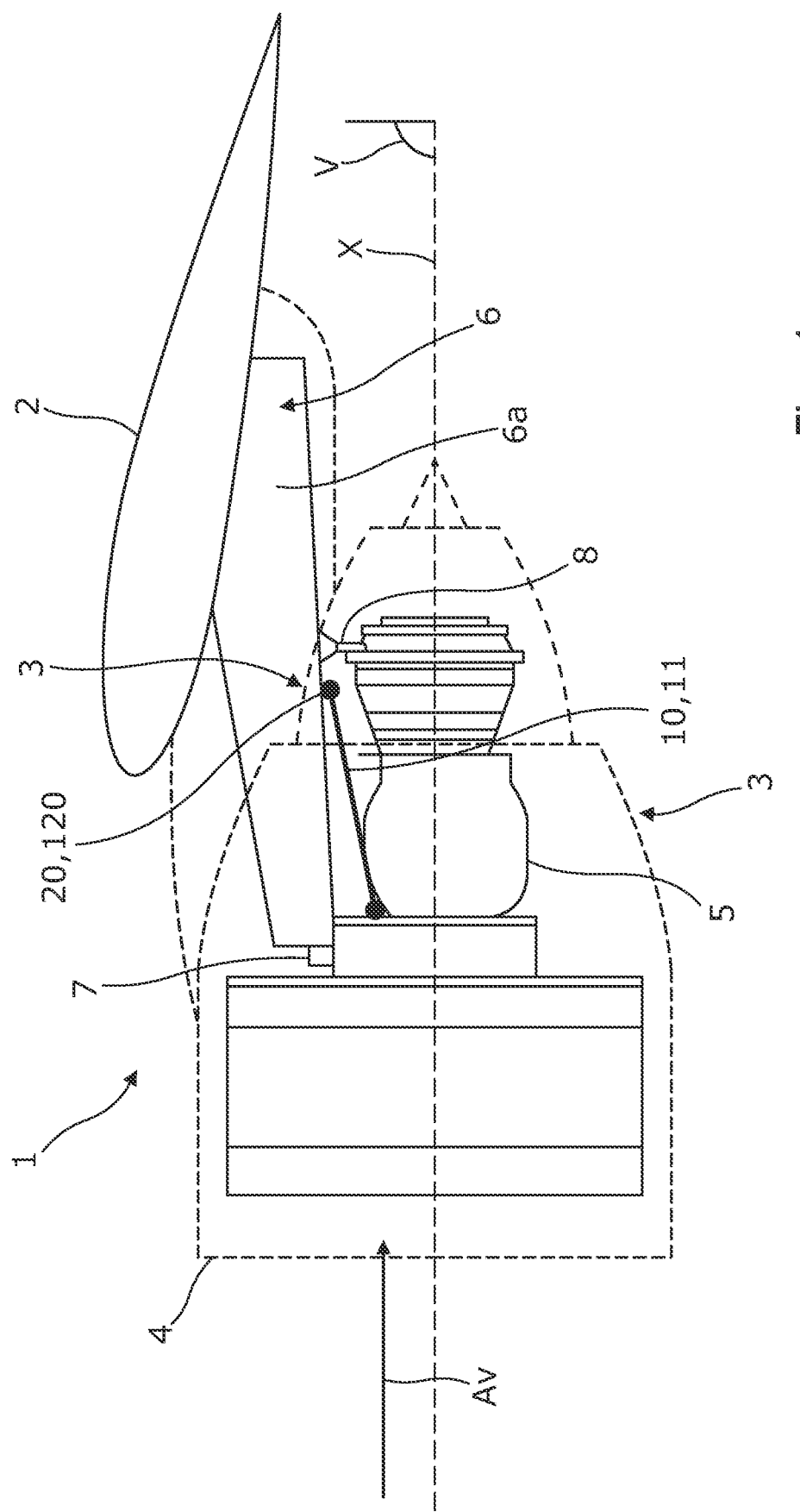
FIG. 1 is a schematic lateral depiction of a propulsion assembly (the nacelle being shown in dashed line)
Figure 2:
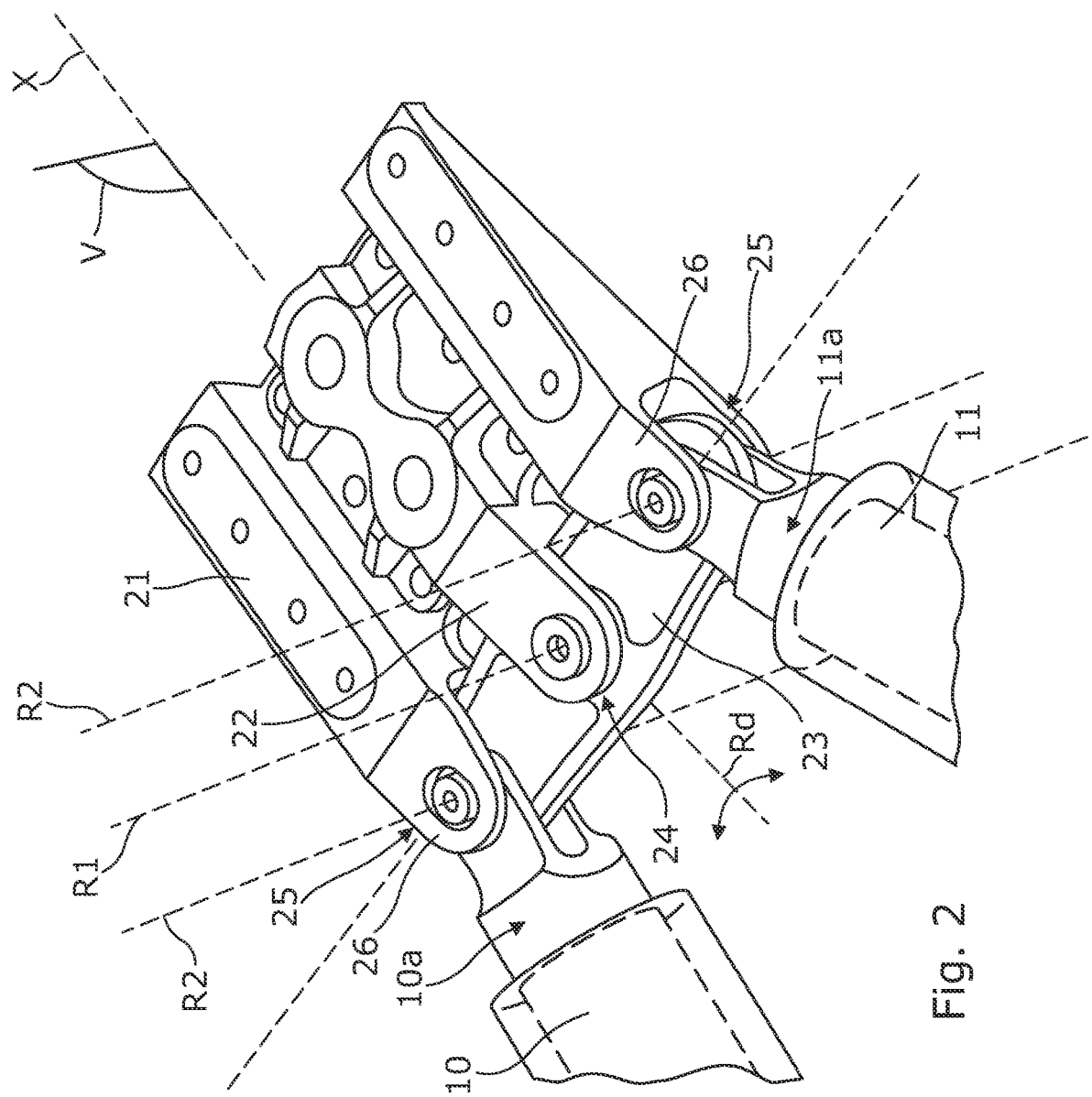
FIG. 2 is a perspective view of a force reacting assembly comprising a connection device fastened to thrust rods, according to the prior art.

With reference to FIGS. 1, and 3 through 5, an assembly of an engine 5 with the primary structure 6a of an aircraft pylon 6 comprises a front engine attachment 7 at the front, a rear engine attachment 8 at the rear, and, between the front and rear engine attachment 7, 8, a force reacting assembly 9.

In the following description, terms relating to a position are considered in relation to the arrow Av showing the direction of flow of the air streams entering the engine 5 during operation of the latter.

The force reacting assembly 9 comprises a connection device 120 secured to the primary structure 6a and two rods 10, 11 fastened both to the engine and to the connection device 120.

The connection device 120 comprises a shoe 121 connected to the primary structure 6a by fastening elements (schematically shown by lines of axis L), and a spreader 122 connected to the shoe 121 by a main connection 130.

The spreader 122 is in the for of a flat fitting extending, lengthwise along a longitudinal axis L, between a first and a second end 122a-b. The spreader has, between the two ends 122a-b, a central part 122c connected to the shoe 121 by a main connection 130.

A first thrust rod 10 has a rear end 10a connected to the first end 122a of the spreader 122 by a first secondary connection 140, and a front end (not shown) connected to the engine 5. The second thrust rod 11 has a rear end 11a connected to the second end 122b of the spreader by a second secondary connection 150, and a front end (not shown) connected to the engine 5.

The main connection 130 comprises a main clevis 131 fastened to the shoe 121, for example by bolts 132, and a main rotation pin 133 (shown schematically by a line of axis Rp in FIG. 3) supported by the main clevis 131 and passing through an orifice 134 arranged on the central part 122c, called the central orifice, arranged so as to pass through the spreader 122 and equipped with a swivel bearing 134a. The main rotation pin 133 is positioned in the plane of symmetry V of the connection device 120, passing through the longitudinal axis X of the engine 5.

The spreader 122 also comprises two through-orifices 135, called lateral orifices, arranged on either side of the central orifice 134, with one lateral orifice 135 at each of the first and second ends of the spreader 122a-b. Each lateral orifice 135 is equipped with a swivel bearing 135a.

Each of the first and second secondary connections 140, 150 comprises:

a secondary clevis with two arms 141, 151 between which the spreader 122 is arranged and wherein each secondary clevis 141, 151 is provided at each of the rear ends of the rods 10a, 11a, and a secondary rotation pin 142, 152 (shown schematically by a line of axis Rs in FIG. 3) supported by the secondary clevis 141, 151 and housed in a lateral orifice 135.

The first and second rods 10, 11, the secondary connections 140, 150, the spreader 122, the main connection 130 and the shoe 121 define two primary thrust paths.

The connection device 120 also comprises a first and a second fitting 160, 170 that are as one with the shoe 121 and are disposed on either side of the main clevis 131 (when the latter is mounted on the shoe) symmetrically with respect to the plane of symmetry V. Each of the first and second fittings 160, 170 comprises an upper arm 161, 171 and a lower arm 162, 172 between which the spreader 122 is positioned. Identically for each of the first and second fittings 160, 170, the upper arm and the lower arm each comprise a flat inner face 171a, 172a (shown in FIG. 5 only, for the second fitting). For each fitting 160, 170, the inner faces 171a, 172a of the upper arm 161, 171 and of the lower arm 162, 172 are situated facing one another and are parallel.

The upper arm 161 and lower arm 162 of the first fitting 160 sandwich the secondary clevis 141 provided at the rear end 10a of the first rod. The upper arm 171 and lower arm 172 of the second fitting 170 sandwich the secondary clevis 151 provided at the rear end 11a of the second rod.

For each of the fittings 160, 170, the upper arm 161, 171, just like the lower arm 162, 172, comprises an oblong hole 163, 173 configured to house the ends of the secondary rotation pins 142, 152. Each of the first, respectively second, fittings 160, 170 is thus connected to the rear end 10a, 11a of the first, respectively second, thrust rod via the first, respectively second, secondary connection 140, 150.

In the event of failure of one of the first or second thrust rods 10, 11, the fitting 160, 170 situated in the extension of the failing rod limits the rotational movements about the main rotation pin 133 that are generated by the remaining rod. Thus the thrust rods 10, 11, the secondary connections 140, 150 and the fittings 160, 170 define two secondary thrust paths, between the engine 5 and the primary structure 6a, which compensate for a possible failure of one of the primary thrust paths.

The first and second thrust rods 10, 11, the shoe 121, the spreader 122, the main connection 130 and the first and second secondary connections 140, 150 are not described further since they can be identical to those of the prior art.

The spreader 122 can pivot about a displacement rotation axis Rd contained in the plane of symmetry V and perpendicular to the main rotation pin and axis 133, Rp. The amplitude of displacement of the spreader 122 about the displacement rotation axis Rd is limited by the space between the arms of each fitting 160, 170.

According to the disclosure herein, the spreader 122 comprises two extensions 122p, with one extension arranged at each end of the spreader and extending the spreader 122 in a direction parallel to the longitudinal axis of the spreader. Each extension 122p is associated with a pair of elastic stops 185 sandwiching the extension.

For the first, respectively second, end of the spreader 122a-b, each stop 185 of a pair of stops is positioned in the space between an arm of the first, respectively second, fitting 160, 170 and the extension 122p, and is made up of a folded piece having a section in the shape of a U, with:

a first leg 185a, which is flat, fastened to the arm of the fitting 160, 170; a second leg 185b, which is flat, parallel to the first leg and intended to be in contact with the extension 122p; and a base 185c joining the two legs 185a, b and arranged at a distance from the fitting, such that each stop 185 is open towards the inside of the connection device 120.

Figure 3:
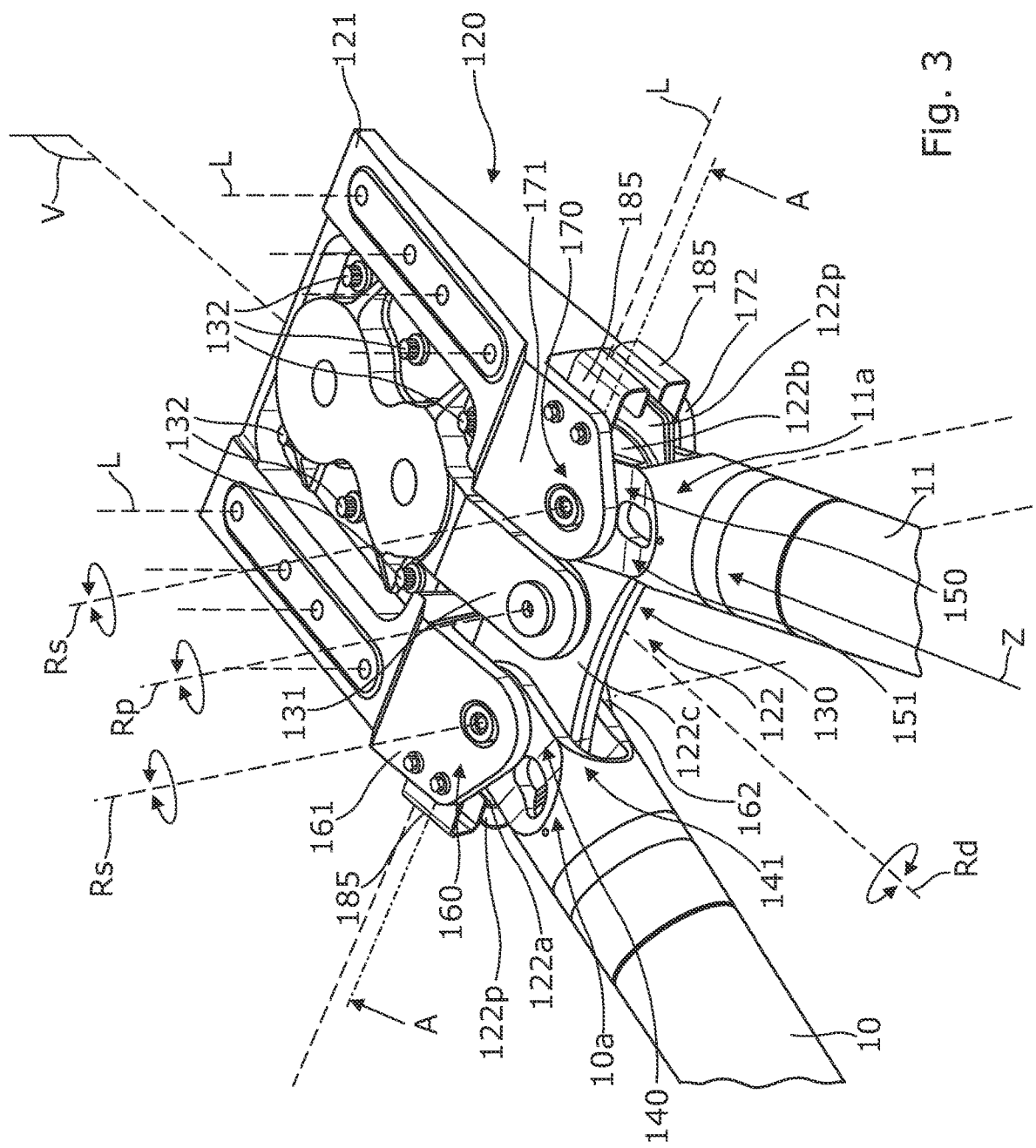
FIG. 3 is a perspective view of a force reacting assembly comprising a connection device fastened to thrust rods, according to one embodiment of the disclosure herein.
Figure 4:
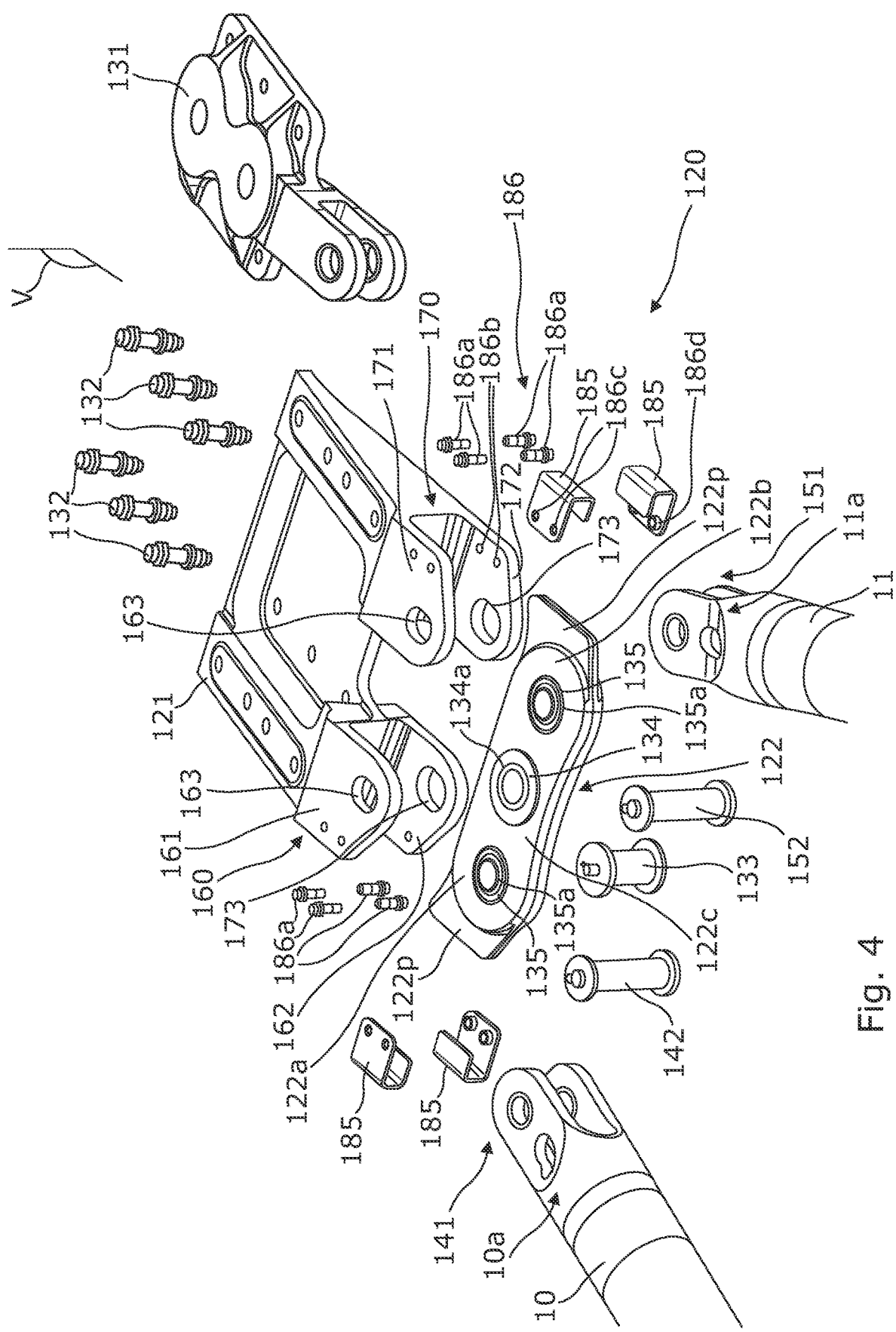
FIG. 4 is an exploded view of the force reacting assembly shown in FIG. 3.
Figure 5:
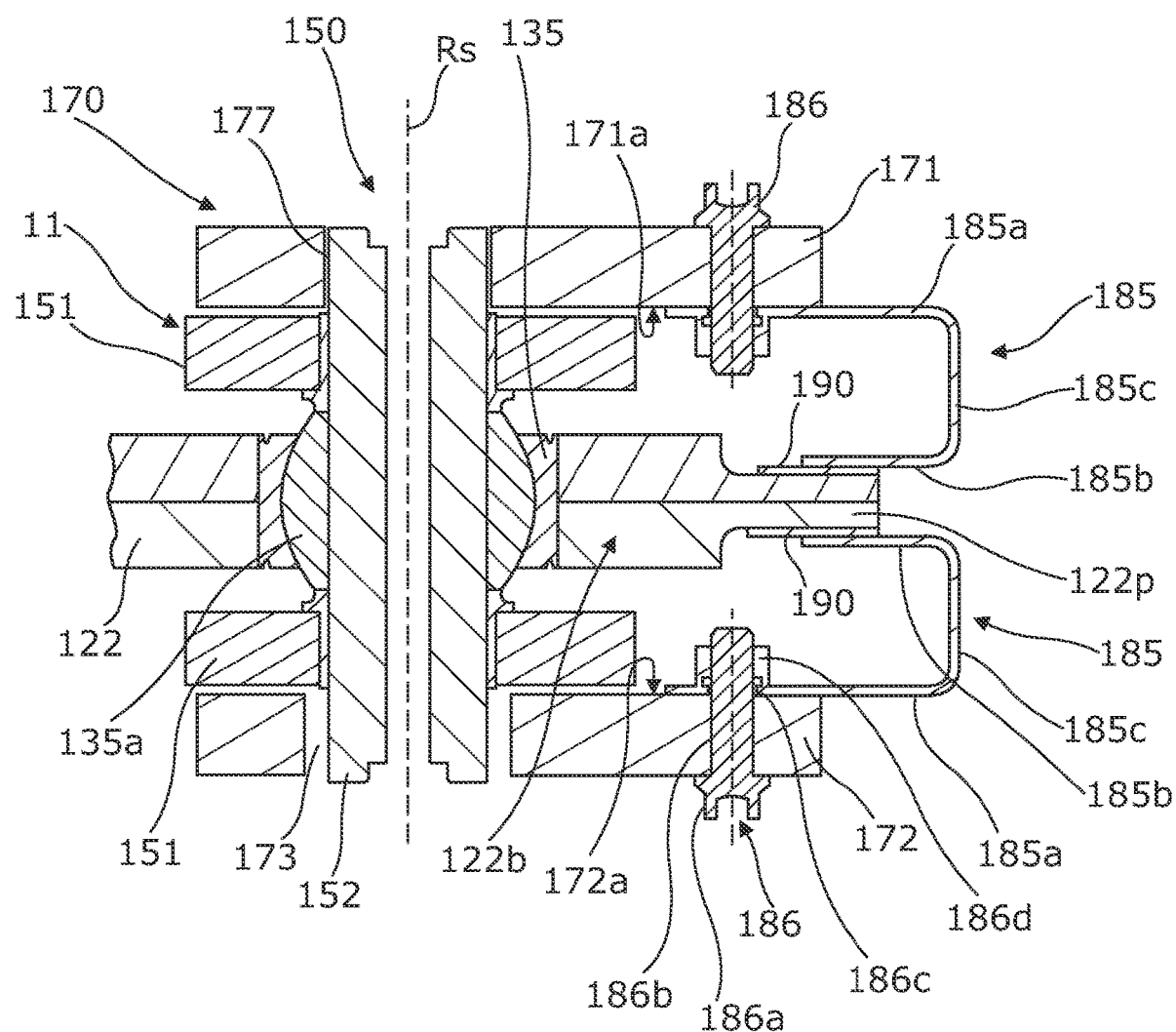
FIG. 5 is a view in section, on the section plane A-A, of a part of the force reacting assembly shown in FIG. 3, the part being shown being indicated by the arrow Z.

As shown in FIGS. 3 through 5, all the stops are identical. In the example shown in these figures, only a portion of the first leg 185a of each stop is in contact with the upper or lower arm 161, 162, 171, 172 of the fitting to which the stop is fastened, and only a portion of the second leg 185b of each stop is intended to come into contact with an extension 122*p*. The base 185*c* is thus arranged outside the space between the two arms of the fitting 160, 170 to which the stop is fastened, and at a distance from the portion of the first leg 185*a* in contact with the arm of the fitting and at a distance from the portion of the second leg 185*b* in contact with the extension 122*p*.

Each stop 185 is mounted without play in the space between the upper or lower arm 161, 162, 171, 172 and the extension 122*p*. Thus, when the amplitude of displacement of the spreader 122 about the displacement rotation axis Rd is zero (i.e. the longitudinal axis of the spreader is perpendicular to the plane of symmetry V), the second leg 185*b* is in plane-plane contact with the extension 122*p* of the spreader.

Each stop 185 is fastened to an upper or lower arm 161, 162, 171, 172 of a fitting 160, 170 by fasteners 186. A fastener comprises, for example, a screw 186*a*, a through-orifice 186*b* arranged on the arm and a through-orifice 186*c* arranged on the first leg 185*a* of the stop for the screw to pass through, and a cage nut 186*d* welded to the first leg 185*a* of the stop 185 and arranged in the space between the first and second legs 185*a, b* so that the screw 186*a* can be screwed therein.

As shown in FIG. 5, it will be noted that each stop 185, which is of constant width, comprises a first leg 185*a* that is longer than the second leg 185*b* so that there is enough space on the first leg 185*a* to arrange the fasteners 186 thereon.

Each stop 185 is made of metal that can deform significantly without undergoing plastic deformation. The specific U shape of the stop 185 and the metallic material used confer a spring-type behavior on it that tends to move the legs 185*a-b* away from one another towards a position of equilibrium after a stress has been applied to one leg that tends to bring it closer to the other leg. In the position of equilibrium, the two legs 185*a-b* of the stop are parallel.

When the stops 185 are fastened as described above, the spring-type behavior of the stop 185 makes it possible to limit, in a linear manner, any rotational movement of the spreader 122 about the displacement rotation axis Rd that would tend to deform the stop 185 by bringing its two legs closer to one another.

Thus, the assembly for limiting the displacement of the spreader 122 makes it possible to reduce the oscillations of the spreader 122 about the displacement rotation axis Rd, following the operation of the engine 5.

Preferably, and as shown in FIG. 5, in order not to damage the spreader 122 as a result of repeated contact between the extensions 122*p* thereof and the stops 185, each extension 122*p* is provided with two wear pads 190, with one wear pad 190 on each of the two faces of an extension 122*p*. Each wear pad is dedicated to a stop 185 and is arranged at the zone of contact with the secondary leg 185*b* of the stop that is dedicated thereto. When the amplitude of displacement of the spreader 122 about the displacement rotation axis Rd is zero (i.e. the longitudinal axis L of the spreader is perpendicular to the plane of symmetry V), the second leg 185*b* of each stop 185 is in contact with the wear pad 190 that is associated therewith.

Each wear pad 190, which is made for example of metal or of Teflon®, is removably fastened, for example via screws, to the extension 122*p* so that it can be replaced easily when its level of wear is judged to be too high.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection device configured for connecting an engine with an aircraft pylon, the connection device comprising:
a shoe fastened to the pylon;
a spreader extending along a longitudinal axis between first and second ends and having a central part connected to the shoe by a main connection comprising a main rotation pin and axis contained in a plane of symmetry of the connection device;
two fittings as one with the shoe and disposed on either side of the plane of symmetry, wherein each of the two fittings has two arms between which the spreader is positioned;
a first, respectively second, rod comprising a front end fastened to the engine and a rear end fastened to the first, respectively second, end of the spreader and to the first, respectively second, fitting by a secondary connection, wherein the spreader comprises two extensions, with one extension arranged at each end of the spreader and extending the spreader in a direction parallel to the longitudinal axis of the spreader, each extension being associated with a pair of elastic stops sandwiching the extension, and wherein, for the first, respectively second, end of the spreader, each stop, which is positioned between an arm of the first, respectively second, fitting and the extension, has a section in a shape of a U open towards an inside of the connection device with a first leg fastened to the arm of the fitting, a second leg for contact with the extension, and a base joining the two legs and arranged at a distance from the fitting.

2. The connection device according to claim 1, wherein each extension comprises two wear pads, with one wear pad dedicated to each of the two stops of the pair of stops associated with the extension.

3. The connection device according to claim 2, wherein each wear pad is made of metal or of Teflon.

* * * * *